April 21, 1970  D. E. WILCOX ET AL  3,507,158

ACCELEROMETER

Filed Dec. 9, 1959  5 Sheets-Sheet 1

INVENTORS
DOYLE E. WILCOX
WILLIAM M. SCARBOROUGH
BY ELLIOTT R. BUXTON

Edward A. Sokolski

AGENT

April 21, 1970  D. E. WILCOX ET AL  3,507,158
ACCELEROMETER
Filed Dec. 9, 1959  5 Sheets-Sheet 2

INVENTORS
DOYLE E. WILCOX
WILLIAM M. SCARBOROUGH
BY ELLIOTT R. BUXTON

AGENT

INVENTORS
DOYLE E. WILCOX
WILLIAM M. SCARBOROUGH
BY ELLIOTT R. BUXTON

AGENT

April 21, 1970     D. E. WILCOX ET AL     3,507,158

ACCELEROMETER

Filed Dec. 9, 1959     5 Sheets-Sheet 4

INVENTORS
DOYLE E. WILCOX
WILLIAM M. SCARBOROUGH
BY ELLIOTT R. BUXTON

Edward A. Sowloski

AGENT

INVENTORS
DOYLE E. WILCOX
WILLIAM M. SCARBOROUGH
BY ELLIOTT R. BUXTON

AGENT

United States Patent Office 3,507,158
Patented Apr. 21, 1970

3,507,158
Doyle E. Wilcox, Puente, William M. Scarborough, Whittier, and Elliott R. Buxton, Downey, Calif., assignors to North American Rockwell Corporation, a corporation of Delaware
Filed Dec. 9, 1959, Ser. No. 858,523
Int. Cl. G01p 15/08, 15/02; F16c 7/04
U.S. Cl. 73—517                                    5 Claims

ABSTRACT OF THE DISCLOSURE

The disclosure is directed to an angular accelerometer in which an inertia member is supported for rotational movement by a pressurized fluid bearing. Electrical pickoff coils are disposed in coupling relationship to the inertia member to provide an electrical signal output, to which output an electrical torquer is responsive in a manner to provide an output proportional to the acceleration to which the accelerometer is subjected.

---

This invention relates to accelerometers and more particularly to an accelerometer having as its acceleration sensitive element an inertial member supported by a fluid bearing which is maintained in a balanced position relative to a fixed member.

Accelerometers are used quite extensively in stabilization equipment such as, for example, may be required in autopilots for use in missiles, aircraft, and boats or in radar antennas. In such applications, accelerometers measuring angular acceleration are generally utilized. Generally, angular accelerometers for this type of application comprise rate sensitive gyroscopes having rotors which rotate at high speeds with an associated electronic differentiator. Such devices have several disadvantages. These include limited life due to the hard wear on bearings with high speed rotation and susceptibility to damage by shock and vibration due to the inherent delicate nature of gyroscopes. In addition, such devices tend to have cross coupling, i.e., they tend to be sensitive to motion about other axes when measuring motion about the principal acceleration sensitive axis.

Accelerometers have been developed in which an inertial mass is suspended on springs and the motion of this mass on its spring support is used to generate a signal proportional to acceleration. The use of such a spring supported inertial device eliminates some of the problems of the gyroscopic type of accelerometer but has inherent disadvantages of its own, mainly, the requirement for relatively large springs to properly support the inertial mass to enable the device to withstand severe mechanical shocks.

The device of this invention is a simple and compact yet accurate accelerometer in which many of the above enumerated problems inherent in both the rotating type accelerometer and the spring mounted inertial mass type device are eliminated. Basically, this end result is achieved by utilizing an acceleration sensitive inertial element which is mounted on a fluid bearing. This fluid bearing is interposed between opposing surfaces of a fixed member and the inertial element. In order to assure proper support for the inertial element, the fluid bearing is pressurized by means of a compact pump mounted on the fixed member. In essence, therefore the inertial element is floated on its liquid bearing and makes no contact with the fixed member or any other solid surface. The acceleration sensitive inertial element is maintain in a balanced position relative to the fixed member by torquer means mounted on the fixed member. Pickoff means mounted on the fixed member derive an electrical signal proportional to the acceleration which is properly processed and fed to the torquer means. The inertial element has a permanently magnetic member as a component thereof and this magnetic member appropriately coacts with the torquer means to bring the inertial element to a balanced position relative to the fixed member. The inertial element is thereby maintained in a separate balanced position for each acceleration input signal, an electrical signal proportional to the acceleration being generated to maintain this balanced position. This balancing signal is used as an output indicative of acceleration. The device of this invention thus provides a simple and compact yet highly effective accelerometer which avoids some of the drawbacks of both gyroscopic devices and devices utilizing spring mounted inertial masses.

It is therefore an object of this invention to provide an improved accelerometer.

It is a further object of this invention to provide an accelerometer having greater reliability and ruggedness than existing devices.

It is a further object of this invention to provide a simple yet highly accurate accelerometer which lends itself to miniature construction.

It is still a further object of this invention to provide an improved accelerometer having an acceleration-sensitive element which is flotation-mounted on a fluid bearing and further which is maintained in a balanced position relative to a fixed member.

Other objects of this invention will become apparent from the following description taken in connection with the accompanying drawings in which FIG. 1 is a plan view of a preferred embodiment of the invention;

It is to be noted that when the inertial element is balanced about its sensing axis, which coincides with the rotation axis, the device operates as an angular accelerometer. The device, as is well known in the art, may be adapted to function as a linear accelerometer by creating an unbalance in the inertial element. This will cause the accelerometer to become sensitive to accelerations along an axis normal to that of the weight unbalance.

Figure 4:
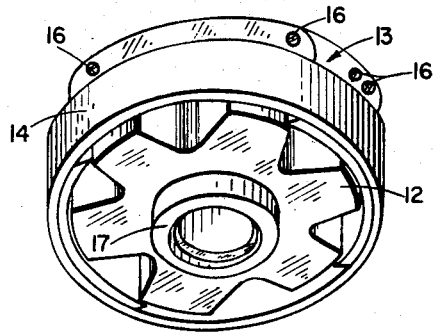
FIG. 4 is a perspective view of the inertial element of the embodiment of FIG. 1.
Figure 6:
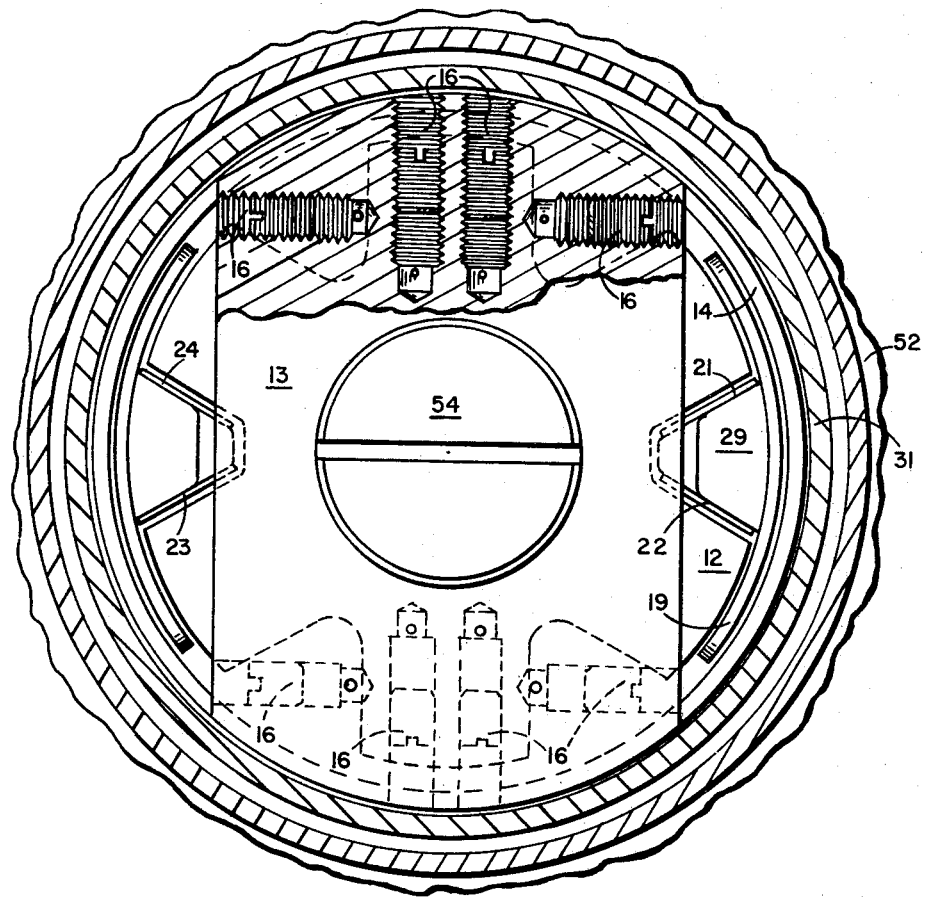
FIG. 6 is a cross-sectional view with a cutaway section of the embodiment of FIG. 1 taken along the line 6—6 in FIG. 1.

Referring to FIG. 4, which is a perspective view of the inertial element, the inertial element is comprised of a star magnet 12 which is fixedly attached to an inertial mass 13 by cementing or any other suitable means. The star magnet has a cylindrical sleeve 17 fixedly attached thereto to provide bearing forming surfaces for the fluid bearing. Inertial mass 13 has flux ring 14 as a component thereof to provide a flux return path for star magnet 12. Balance screws 16 are adjustably mounted within the inertial mass 13. Referring additionally to FIG. 6, these balance screws are positioned on each of four sides of the inertial mass. In the embodiment illustrated, eight of these screws are provided, two on each of four sides.

Figure 3:
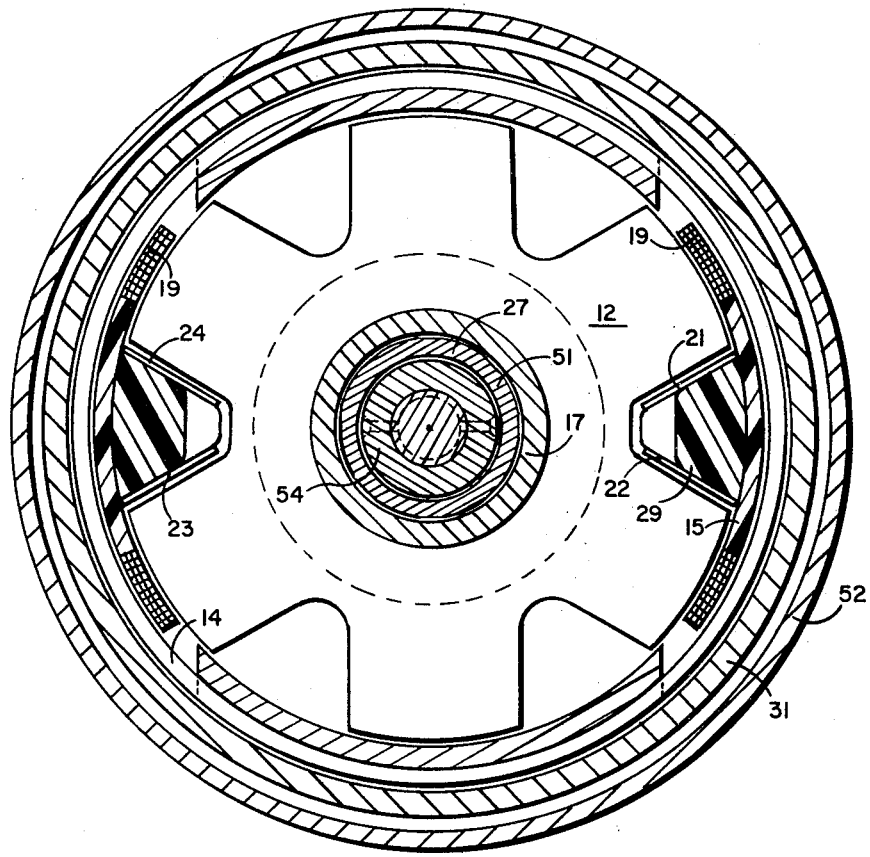
FIG. 3 is a cross-sectional view of the embodiment illustrated in FIG. 2 as taken along line 3—3 indicated in FIG. 2.
Figure 5:
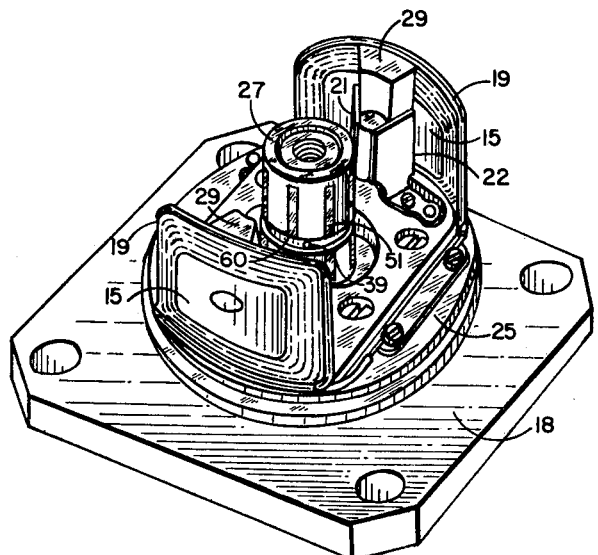
FIG. 5 is a perspective view of the fixed member of the embodiment of FIG. 1.

Referring to FIG. 5, which is a perspective view of the fixed member, two torquer coils 19, each of which is wound on a separate plastic form 15, are provided. The coil forms 15 are mounted on support 25 which is fabricated of insulating material and which is fixedly attached to base 18. These coils are oppositely orientated with respect to each other and in the assembled unit each coil will be positioned adjacent to oppositely poled elements of star magnet 12 (see FIG. 3). Capacitive pickoff plates 21–24 (refer additionally to FIG. 3) are fixedly mounted on insulating support 25. This insulating support is fixedly attached to base 18. Columns 29, which are made of insulating material and which are fixedly attached to support 25, provide additional support for both the pickoff plates 21–24 and torquer coils 19. The fixed member has a cylindrical portion 27 which is one of the members which form the fluid bearing.

Figure 1:
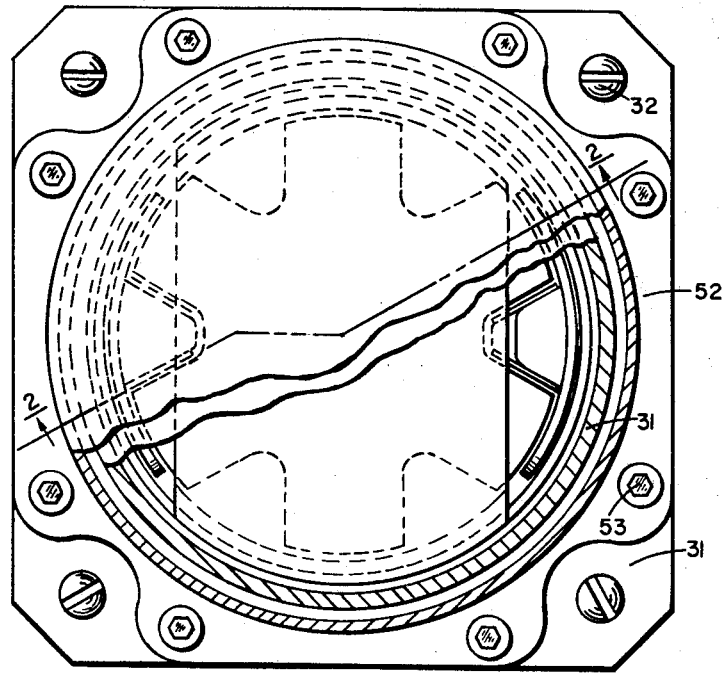
Figure 2:
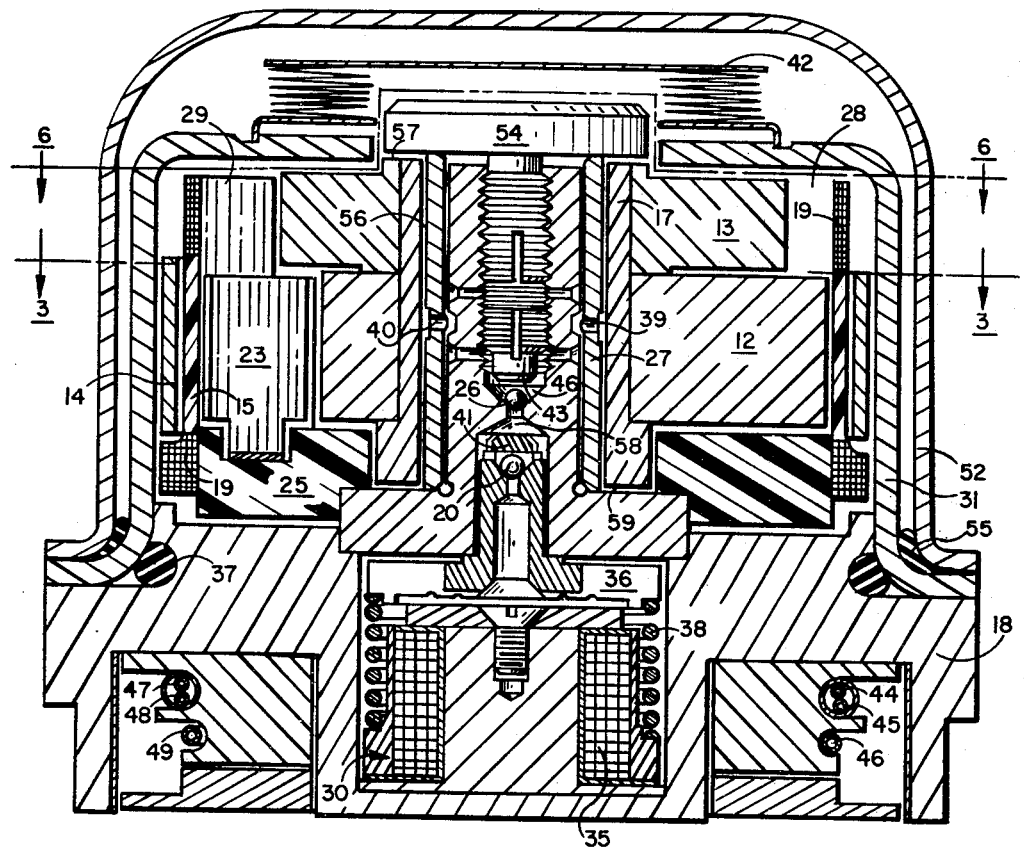
FIG. 2 is a cross-sectional view of the embodiment of FIG. 1 as taken along the line 2—2 indicated in FIG. 1.

Referring to FIG. 2, a sealed cavity 28 is formed under cover 31 to hold the fluid utilized for the bearing. Cover 31 is attached to base 18 by means of screws 32 (see FIG. 1) and associated threads (not shown) in base 18. This cavity is appropriately sealed after proper filling by means of O ring 37. The bearing fluid may be liquid or gaseous. In a working embodiment of the device of this invention, fluorolube, grade FS liquid was found to operate satisfactorily.

Fluid bearing pressure is maintained by means of pump 30 which is a single action reciprocating pump. Pumping action is achieved by providing periodic pulses of electric current to pump solenoid 35. Such pulses of current will cause magnetic pump piston 36 to be drawn down. When piston 36 is drawn down, ball valve 20 will be forced upward by the fluid pressure until it hits against stop 41 thereby allowing fluid to pass to cavity 58. In between pulses spring 38 will drive piston 36 upward, thereby forcing the fluid in cavity 58 up. The fluid pressure developed will cause ball valve 20 to close and ball valve 26 to open until it hits against stop 43 and will force the fluid in cavity 58 up through valve 26, cavity 46 and apertures 39 and 40 in cylindrical portion 27.

Thereby a pressurized fluid bearing is formed between the opposing surfaces of cylindrical sleeve 17 of the inertial element and cylindrical portion 27 of the fixed member. Pump 30 may be excited by a pulse signal. It has been found that between 10 and 60 pulses per second provides adequate pressurization of the bearing in an operative model of the device of the invention. Bellows 42 provide expansion or contraction volume for the liquid resulting from changes in temperature.

Electrical leads 44–49 in base 18 carry a torquing signal to torquing coils 19 and provide connections to capacitive pickoff plates 21–24. These leads and the leads (not shown) for pump 30 and for the pickoff reference may all be brought to an appropriate socket (not shown) mounted on base 18. The details of the electrical connections made both to the torquer coils and the pickoff plates will be explained in detail in connection with FIG. 7.

A magnetic shield 52 is provided to completely surround the acceleration sensitive element to prevent outside magnetic influences from affecting the operation of the device. Shield 52 is attached to base 18 by means of machine screws 53 (see FIG. 1). An O ring 55 is used to provide a seal between shield 52 and cover 31. A cap screw 54 is utilized to retain the inertial element within appropriate confines when the bearing is pressurized, at the same time providing access to the fluid pressurization mechanism.

Referring to FIG. 6, balance screws 16 which are provided along both axes normal to the rotation axis (sensing axis) should be adjusted with a screwdriver to attain precise balance of the sensing element about the sensing axis. Since the sensing element is in a damping liquid, it is necessary to have both mass and bouyancy balance. Such dual balance may be achieved utilizing techniques well known in the art.

The use of a magnet having multiple pairs of poles which in the illustrated embodiment is a star magnet rather than a bar magnet as the magnetic medium to coact with the torquer coils minimizes magnetic leakage and thereby keeps error torques to a minimum. In some applications a simple 2 pole bar magnet may be used in place of the radial pole magnet shown in FIGURE 6 with, of course, some increase in errors due to external magnetic influences.

Referring to FIGS. 2 and 5, the liquid bearing which supports the acceleration sensitive element is formed along the side 56 of cylindrical portion 27 of the fixed member, between the top end 57 of the inertial element and cap screw 54, and between the bottom end 59 of the inertial element and the fixed member. As shown in FIG. 5, cylindrical portion 27 has a number of equispaced longitudinal flattened sections 51 along approximately ¾ of its radial bearing forming surface. These flats 51, may for example, have a depth of about .0007 inch in a cylindrical portion 27 with an overall diameter of ⅓ of an inch. The use of such flats reduces the circumferential fluid flow and thereby increases the efficiency of the bearing in handling radial loads. Experimentation has indicated that the use of such flattened sections doubles the efficiency of the bearing. Groove 60 is provided in cylindrical portion 27 to facilitate the fluid flow to the bearing surfaces.

It thus can be seen that the acceleration sensitive inertial element is completely floated with respect to the fixed member with appropriate bearings to support both radial and thrust loads. The use of such a flotation system contributes to the accuracy of the accelerometer. The threshold acceleration level of the inertial element is reduced to a negligible value by using fluid flotation of the acceleration sensitive element. The bearing is designed so that when properly pressurized it will rigidly support the inertial element and define the axis of rotation without metal to metal contact between the fixed and inertial elements.

Figure 7:
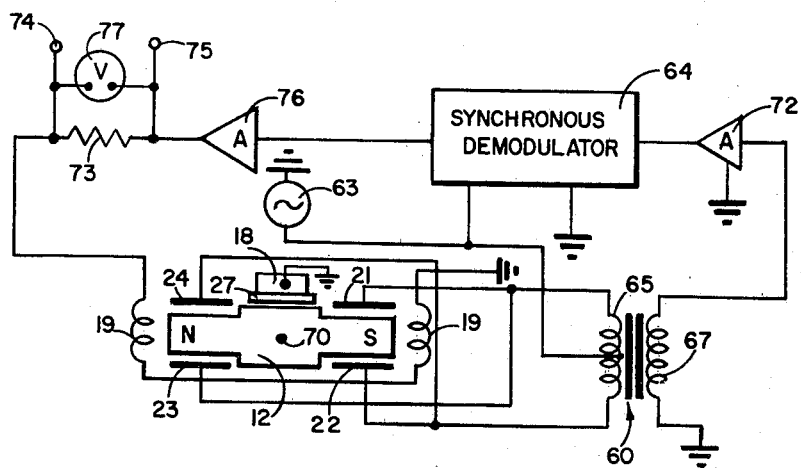
FIG. 7 is a schematic diagram of electrical control circuitry which may be used in the device of the invention.

Referring to FIG. 7, a schematic diagram of control circuitry which may be used with a device of this invention is illustrated. This control circuitry is used to produce a D-C signal having a polarity and magnitude proportional to acceleration. An A-C reference signal is supplied by A-C source 63 and is coupled to the center tap of winding 65 of the bridge transformer 60 and to synchronous demodulator 64. This A-C signal may be any convenient frequency such as, for example, 5,000 cycles per second. An A-C bridge circuit is formed by the halves of the primary winding 65 of the transformer and the capacitances existing between the plates 21–24 and the poles of the magnet 12. Magnet 12 is effectively kept at A-C ground potential by virtue of the relatively large capacitance existing between the closely-spaced cylindrical portion 27 and star magnet 12, cylindrical portion 27 being connected to base 18 which is grounded. Flexible conductive wire connections to the inertial sensing element are therefore unnecessary. The dielectric constant of the fluid which may be used for the bearing will contribute to a relatively high capacitance between the plates 21–24 and the magnet 12 and between the magnet 12 and cylindrical portion 27 thereby presenting between these elements a relatively low impedance to signals in the neighborhood of 5,000 cycles per second. Pickoff plates 21–24, as already noted, are fixedly mounted on an insulating support 25 which is attached to the fixed member. When the inertial element is not being subjected to an acceleration signal, magnet 12 will be positioned so that all of its sides adjacent pickoff plates 21–24 are equidistant from these plates. Under these conditions the currents coupled through these plates will all be equal. It is to be noted that capacitive plates 21 and 23 are both connected to the top end of winding 65 of transformer 60 while capacitive plates 22 and 24 are connected to the bottom end of winding 65. Therefore, the current flowing between the center tap of winding 65 which is connected to signal source 63 and the top end of this winding will be equal to but effectively 180° out of phase with the current flowing from the center tap of winding 65 to the bottom end of this winding. These equal and opposite currents flowing through windings 65 will balance each other out to produce no resultant change in current in the winding, and therefore no current will be induced into secondary winding 67 of transformer 60.

When the inertial element is subjected to an acceleration, star magnet 12 will rotate about its axis 70 in accordance with this acceleration. Let us assume that the acceleration is such as to bring the associated magnet sides closer to plates 21 and 23 and further away from plates 22 and 24 as would be the case with a counterclockwise rotational motion of the magnet. Under such conditions, a greater signal will be coupled from the top end of winding 65 through plates 21 and 23 to ground than from the bottom end of winding 65 through plates 22 and 24 to ground. This will result in a greater current flow between the center tap signal connection to the top end of winding 65 than between the center tap signal connection and the bottom end of winding 65. Current will therefore be coupled to secondary winding 67 which has a phase and magnitude which is in accordance with the current flow in the top half of winding 65. The signal produced in winding 67 is amplified by amplifier 72 and fed to synchronous demodulator 64. Synchronous demodulator 64 may be any conventional synchronous demodulator or synchronous rectifier such as, for example, that described in Patent No. 2,711,590, Doyle E. Wilcox inventor, issued June 28, 1955, which will produce a D-C output signal having a polarity and a magnitude which is responsive to the phase and amplitude of the A-C input. Reference source 63 is coupled to synchronous demodulator 64 to provide a reference voltage. The output of synchronous demodulator 64 is amplified by D-C amplifier 76 and fed through resistive load 73 to torquer coils 19. Torquer coils 19, which are identical in construction, are connected in series with each other to ground. Torquer coils 19 should be arranged so that they will have cooperative magnetic torquing effect on magnet 12 to restore the magnet 12 and the inertial element which includes the magnet to a resting position close to the original no acceleration position. Of course, the exact location of this resting position will be a function of the acceleration to which the inertial element is subjected. For any acceleration within the operating range of the accelerometer, however, the total displacement of the inertial element and magnet 12 relative to the fixed member will be minute, and the inertial element will be maintained substantially at the no acceleration or null position.

It can readily be seen that the current flowing through torquer coils 19 and resistive load 73 will be a function of the acceleration to which the inertial element is subjected. Therefore, an acceleration proportional output voltage will appear across resistive load 73 between terminals 74 and 75. A positive-negative reading voltmeter 77 may be used to give a direct indication of this acceleration and the signal appearing between terminals 74 and 75 may be used as an acceleration signal wherever required.

The circuit illustrated in FIG. 7 and described above is only one of many that may be used with the device of the invention. A similar circuit which may be used is described in detail in the above mentioned Patent No. 2,711,590.

The invention thus is a simple yet effective and reliable device for producing an output proportional to angular acceleration which may be readily adapted to respond to linear acceleration. The device of the invention lends itself to miniature construction; a working model having an overall diameter of about 1½ inches has been constructed. As is well known in the art, if the device is to be utilized as a linear accelerometer by unbalancing the inertial element, it must be mounted on a stable platform to enable it to respond to linear accelerations alone. The output which is proportional to acceleration may be integrated by conventional techniques to produce a signal proportional to velocity or double integrated to produce a signal proportional to displacement.

We claim:

1. An accelerometer comprising a fixed member, an inertial element mounted rotatably with respect to said fixed member, fluid bearing means for supporting said inertial element, said bearing means being interposed between opposing surfaces of said fixed member and said inertial element, means for pressurizing said bearing means comprising a pump mounted on said fixed member, said pump being contained within said fixed member, said inertial element having a permanently magnetic member as a component thereof, electrical pickoff means fixedly attached to said fixed member for deriving an electrical signal proportional to the rotation of said inertial element relative to said fixed member, and electrical torquer means responsive to the output of said pickoff means for maintaining said inertial element in a substantially null position relative to said fixed member, said torquer means coacting with said magnetic member, the electrical current flowing in said torquer means being proportional to acceleration.

2. An accelerometer comprising a fixed member, an acceleration sensitive element rotatably mounted with respect to said fixed member, said acceleration sensitive element comprising an inertial mass and a magnet having multiple pairs of poles fixedly attached to said inertial mass, a fluid bearing interposed between said fixed member and said acceleration sensitive element, pump means mounted within said fixed member for pressurizing said fluid bearing, capacitive pickoff plates mounted on surfaces of said fixed member adjacent to surfaces of said magnet and positioned between furcations thereof, a pair of torquer coils mounted on said fixed member, each of said torquer coils being respectively positioned adjacent oppositely poled elements of said magnet, bellows means for automatically relieving pressure increases due to thermal expansion of the fluid, and means connected to said pickoff plates for developing a D-C signal having a magnitude and direction proportional to the relative motion between said fixed member and said acceleration sensitive element, said D-C signal being fed to said torquer coils, whereby said acceleration sensitive element is maintained in a substantially null position relative to said fixed member and said D-C signal is proportional to acceleration.

3. An accelerometer comprising a fixed member, an acceleration sensitive element rotatably mounted with respect to said fixed member, said acceleration sensitive element comprising an inertial mass, a magnet having multiple pairs of poles fixedly attached to said inertial mass, and a cylindrical sleeve fixedly attached to said magnet, said fixed member having a cylindrical portion, the outer longitudinal surface of said cylindrical portion having a plurality of longitudinal flattened sections, said cylindrical sleeve being externally concentric with said cylindrical portion with its inner surface positioned opposite said outer longitudinal surface of said cylindrical portion, a fluid bearing interposed between opposite surfaces of said cylindrical portion and said cylindrical sleeve, pump means mounted within said fixed member for pressurizing said fluid bearing, capacitive pickoff plates mounted on surfaces of said fixed member adjacent said acceleration sensitive element, a pair of torquer coils mounted on said fixed member, each of said torquer coils being respectively positioned adjacent oppositely poled elements of said magnet, bellows means for automatically relieving pressure increases due to thermal expansion of the fluid, and means connected to said pickoff plates for developing a D-C signal having a magnitude and direction proportional to the relative motion between said fixed member and said acceleration sensitive element about the rotation axis of said acceleration sensitive element, said D-C signal being fed to said torquer coils, whereby said acceleration sensitive element is maintained in a substantially null position relative to said fixed member and about its rotation axis said D-C signal is proportional to acceleration.

4. The device as recited in claim 3 wherein said pump means comprises an electrically actuated pump having a pair of ball valves for regulating the pumping action.

5. The device as recited in claim 3 and additionally including an A-C source, the output signal of said A-C source being coupled to said acceleration sensitive element through said pickoff plates, said A-C source signal being coupled from said acceleration sensitive element to said fixed member by virtue of the electrical capacitance between the acceleration sensitive element and the fixed member, said fixed member being connected to the return path of said A-C source.

References Cited

UNITED STATES PATENTS

| | | | |
|---|---|---|---|
| 2,591,921 | 4/1952 | Cosgriff et al. | 73—516 |
| 2,660,484 | 11/1953 | Gerard et al. | 308—9 |
| 2,752,791 | 7/1956 | Jarosh et al. | 74—5.6 |
| 2,841,386 | 7/1968 | Everett | 73—517 |
| 2,846,208 | 8/1968 | Audemar | 73—523 |
| 2,853,287 | 9/1958 | Draper et al. | 73—516 |
| 2,869,851 | 1/1959 | Sedgfield et al. | 73—517 |
| 2,936,624 | 5/1960 | Schalkowsky et al. | 73—516 |

FOREIGN PATENTS

| | | |
|---|---|---|
| 470,454 | 1/1929 | Germany. |

BENJAMIN A. BORCHELT, Primary Examiner

T. H. WEBB, Assistant Examiner

U.S. Cl. X.R.

308—9